(12) United States Patent
Chiaki

(10) Patent No.: US 8,378,925 B2
(45) Date of Patent: Feb. 19, 2013

(54) VIDEO DISPLAY DEVICE

(75) Inventor: Kenzo Chiaki, Kawasaki (JP)

(73) Assignee: Nikon Corporation, Tokyo (JP)

( * ) Notice: Subject to any disclaimer, the term of this patent is extended or adjusted under 35 U.S.C. 154(b) by 618 days.

(21) Appl. No.: 12/314,477

(22) Filed: Dec. 11, 2008

(65) Prior Publication Data

US 2009/0115687 A1   May 7, 2009

Related U.S. Application Data

(63) Continuation-in-part of application No. PCT/JP2007/062218, filed on Jun. 18, 2007.

(30) Foreign Application Priority Data

Jun. 27, 2006   (JP) .................................. 2006-176238

(51) Int. Cl.
*G09G 5/00* (2006.01)

(52) U.S. Cl. .................................. 345/8; 345/7; 359/630

(58) Field of Classification Search .................. 345/7–9; 381/381, 370, 385, 373–374, 376–380; 359/630, 359/632; 349/11

See application file for complete search history.

(56) References Cited

U.S. PATENT DOCUMENTS

| | | | | |
|---|---|---|---|---|
| 5,406,037 A | * | 4/1995 | Nageno et al. | 181/129 |
| 5,708,725 A | * | 1/1998 | Ito | 381/370 |
| 6,195,441 B1 | * | 2/2001 | Ito | 381/381 |
| 7,406,180 B2 | * | 7/2008 | Milde | 381/378 |
| 2002/0031238 A1 | | 3/2002 | Murozaki et al. | |
| 2005/0226452 A1 | * | 10/2005 | Amae et al. | 381/381 |
| 2005/0256675 A1 | * | 11/2005 | Kurata | 702/153 |

FOREIGN PATENT DOCUMENTS

| | | |
|---|---|---|
| JP | U-62-167484 | 10/1987 |
| JP | U-06-009294 | 2/1994 |
| JP | A-06-141308 | 5/1994 |
| JP | A 2002-78057 | 3/2002 |
| JP | A 2004-85476 | 3/2004 |
| JP | A-2004-085476 | 3/2004 |
| WO | WO 2004/061519 A1 | 7/2004 |
| WO | WO 2005027567 A2 * | 3/2005 |

OTHER PUBLICATIONS

Office Action issued in Japanese Application No. 2008-522444 dated Jul. 24, 2012 (w/ English Translation).

\* cited by examiner

*Primary Examiner* — Hong Zhou

(74) *Attorney, Agent, or Firm* — Oliff & Berridge, PLC

(57) ABSTRACT

When headphone housings are tilted such that their upper portions are separated from side faces of the user's head and their lower portions are near the side faces, an arm of the display section is horizontal. Generally, the human head at ear portions is formed in a shape that is large at the upper portion and small at the lower portion. Accordingly, when the headphone housings are installed at the ear portions, the headphone housings are installed according to the shape and the arm is horizontal. This means that the arm is horizontal in a natural installation state. Adjustment of the display section is not complex and the display section has a well-balanced appearance.

5 Claims, 5 Drawing Sheets

VIDEO DISPLAY DEVICE

This is a Continuation-in-Part of Application No. PCT/JP2007/062218 filed Jun. 18, 2007, which claims the benefit of Japanese Patent Application No. 2006-176238 filed Jun. 27, 2006. The disclosure of the prior applications is hereby incorporated by reference herein in its entirety.

TECHNICAL FIELD

The present invention relates to a video display device.

BACKGROUND ART

Recently there have been various glasses-type video display devices in which video displayed on a display device such as a Liquid Crystal Display (LCD) is observed as a virtual image enlarged through an optical system having an eyepiece, a half mirror, or the like. The glasses-type video display devices are called a head-mounted display. For example, WO2004/061519A1 (Patent Document 1) discloses a head-mounted display.

FIG. 1 shows an example of the head-mounted display. In the head-mounted display 1, two headphone housings 2 are connected by a rear arm 3. The rear arm 3 has resilience. In mounting the head-mounted display 1, the headphone housings 2 are located at ear positions, and the human head (ear portions) is caught in a space between the headphone housings 2 by the resilience of the rear arm 3, thereby fixing the head-mounted display 1. That is, the headphone housings 2 are a fixing portion, and the rear arm 3 is a connection portion. As shown in FIG. 1, the head-mounted display 1 is mounted at a position such that the rear arm 3 is orientated toward the back of the head.

A display unit arm 4 is turnably attached to one of the headphone housings 2 with a support portion 5 interposed therebetween, and the display unit arm 4 is slidable back and forth. Turning the display unit arm 4 enables motions of a vertical swing and a level swing. A display unit 7 is attached in a leading-end portion of the display unit arm 4 with a display unit hinge 6 interposed therebetween, and the display unit 7 displays the video on an eye of a user. The display unit 7 can perform motions of yaw, roll, and pitch relative to the display unit arm 4 by action of the display unit hinge 6.

In use, as shown in FIG. 1, the display unit arm 4 is turned, the position in the back and forth direction of the display unit arm 4 is adjusted, and the display unit 7 is rotated about the display unit hinge 6, such that the display unit 7 is located in front of an eye of the user to display the video.

However, because usually an upper portion is larger than a lower portion in a human head shape in ear portions, the headphone housings 2 are obliquely worn as shown in FIG. 2 when the headphone housings 2 are worn in the ear portions. When the display unit arm 4 is attached to one of the headphone housings 2 so as to be kept level at the position where the headphone housings 2 are orientated toward the vertical direction, it is necessary that the display unit 7 be kept level by bending the display unit hinge 6, because the display unit arm 4 is inclined (in such a way that a user side is higher while the outside is lower) in wearing as shown in FIG. 2. Therefore, there arises a problem that a well-balanced appearance cannot be realized while adjustment of the display unit 7 is complicated.

In view of the foregoing, a problem to be solved by the present invention is to provide a video display device which realizes the well-balanced appearance without complicating the adjustment of the display unit.

DISCLOSURE OF THE INVENTION

In order to solve the problem, a first aspect according to the present invention is a video display device which is mounted on a head to observe displayed video, the video display device including: two fixing portions which fix the video display device to the head; a connection portion which connects the fixing portions; a display unit arm which is supported by one of the fixing portions or the connection portion; and a display unit which is provided in a leading-end portion of the display unit arm to display the video on an eye of a user, wherein the display unit arm is supported by the one of the fixing portions or the connection portion such that the fixing portions haves an inclination in which upper portions of the headphone housings depart from side surfaces of the head while lower portions are brought close to the side surfaces when the display unit arm is kept level.

BEST MODE FOR CARRYING OUT THE INVENTION

An exemplary embodiment of the present invention will be described below with reference to the drawings. Because a basic configuration of the embodiment is not largely different from that of the conventional head-mounted display 1 shown in FIG. 1, the same component is designated by the same numeral, and the description of the same portion will be omitted. Only a portion which is different from that of the head-mounted display 1 shown in FIG. 1 will be described below.

Figure 3:
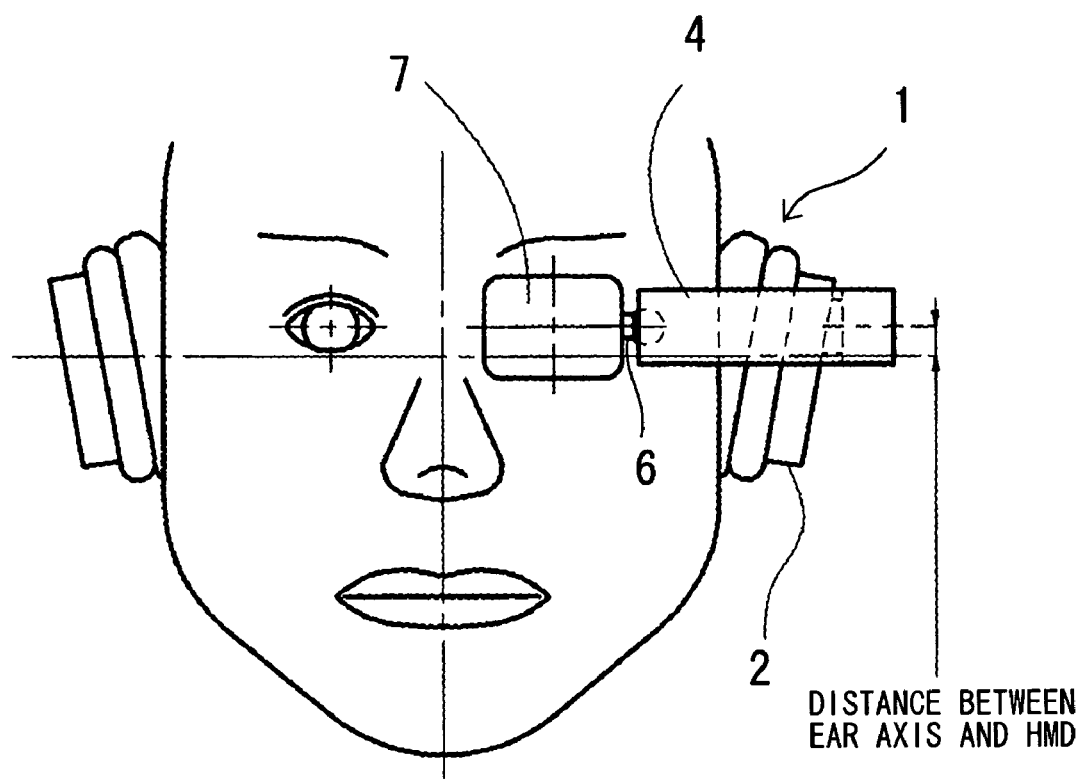
FIG. 3 is a view showing a state in which a head-mounted display according to an embodiment of the present invention is mounted on the head.

In the embodiment, as shown in FIG. 3, a positional relationship between the display unit arm 4 and the headphone housing 2 is determined such that the headphone housing 2 is inclined to abut on the ear portion when the head-mounted display 1 is worn and the display unit arm 4 is kept level. That is, when the display unit arm 4 is kept level, the headphone housing 2 is inclined such that an upper portion of the headphone housing 2 departs from a side surface of the head while a lower portion is brought close to the side surface.

In other words, the display unit arm 4 is kept level, when the headphone housing 2 is inclined such that the upper portion of the headphone housing 2 departs from the side surface of the head while the lower portion is brought close to the side surface. Because usually the upper portion is larger than the lower portion in the human head shape in the ear portions, when the headphone housings 2 are worn in the ear portions, the headphone housings 2 are worn as shown in FIG. 3, and the display unit arm 4 is kept level at that time. Therefore, in a naturally wearing state, the display unit arm 4 is kept level, the adjustment of the display unit does not become complicated, and the well-balanced appearance is also realized. For a degree of inclination, from the viewpoint of relationship with the human head shape, the inclination of the headphone housing should preferably range from 5 to 20° relative to the perpendicular direction when the display unit arm 4 is kept level in the wearing state.

In a positional relationship between an eye-ball center and an ear axis (distance between a geometric center of the display unit and the ear axis), usually the eye-ball center is located above the ear axis by 10 to 30 mm. Therefore, in order to locate the display unit 7 in front of the eye when the display unit arm 4 is kept level and the display unit 7 is also kept level, a support position where the display unit arm 4 is supported by the headphone housing 2 should preferably be located above the ear axis by 10 to 30 mm.

Figure 4:
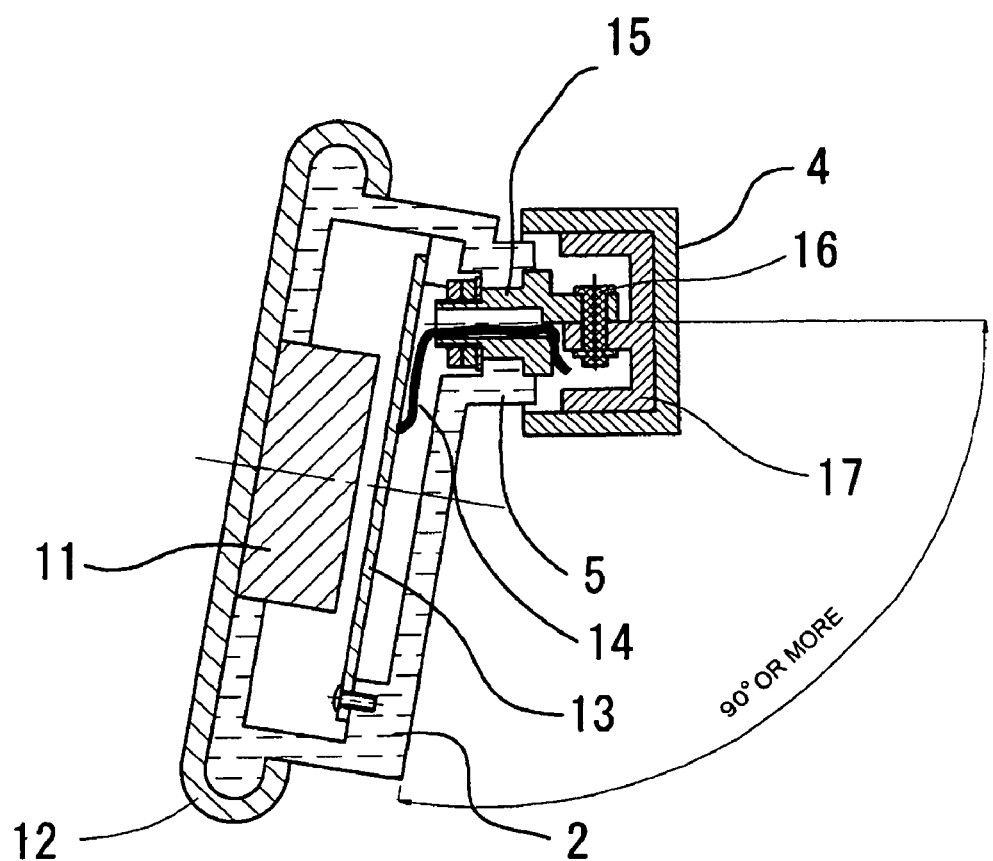
FIG. 4 is a view showing an example of a method for attaching a display unit arm to a headphone housing.

FIG. 4 shows an example of a method for attaching the display unit arm 4 to the headphone housing 2. A driver 11 which generates a sound and an ear pad 12 are attached to the headphone housing 2, and an electric circuit board 13 and electric wiring 14 are accommodated in the headphone housing 2.

Figure 1:
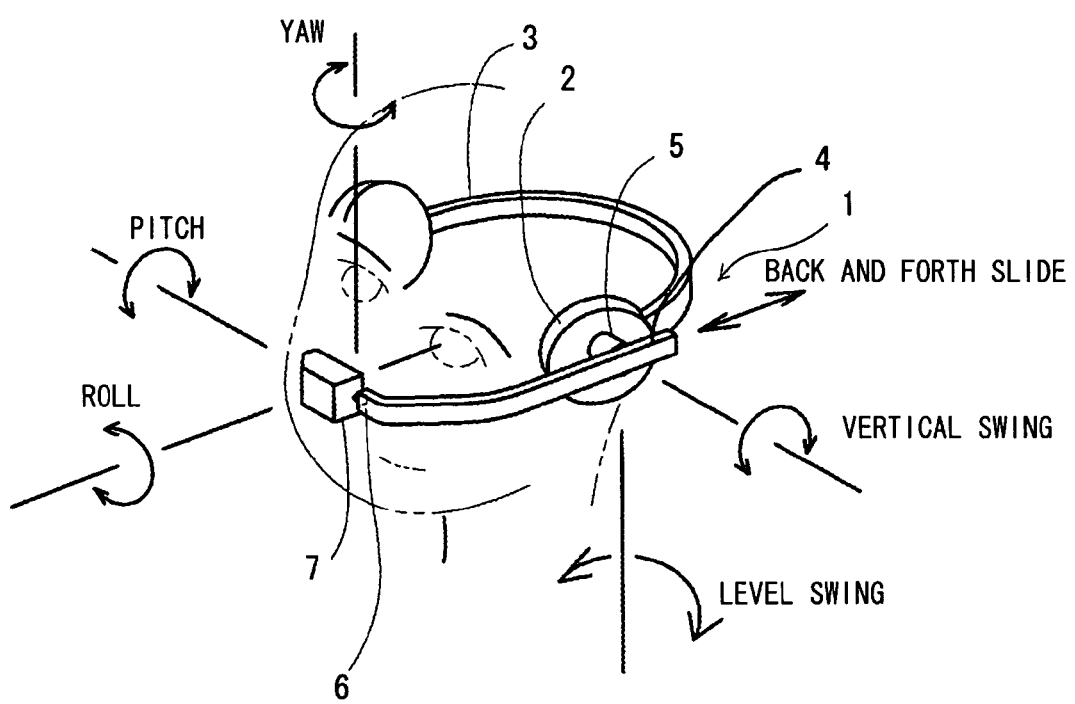
FIG. 1 is a view showing an example of a head-mounted display.
Figure 2:
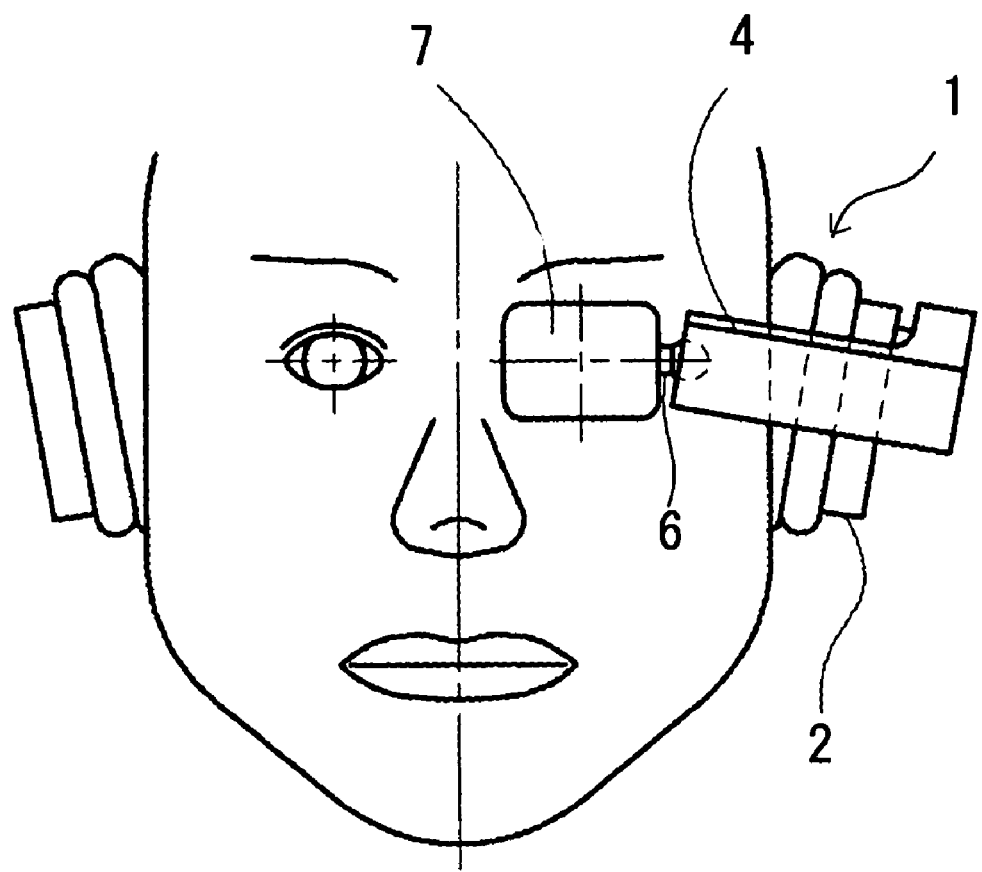
FIG. 2 is a view showing a state in which a conventional head-mounted display is mounted on a head.

A turning pin 15 is fitted in the support portion 5, and the turning pin 15 is turned in the support portion 5 to impart the motion of the vertical swing shown in FIG. 1. Another turning pin 16 is fitted in a leading-end portion of the turning pin 15, and the turning pin 16 is turned in the turning pin 15 to impart the motion of the level swing shown in FIG. 1. A display unit arm support member 17 is attached to the turning pin 16, and the display unit arm 4 is slidable with respect to the display unit arm support member 17 to impart the back and forth slide shown in FIG. 1.

A vertical direction of the headphone housing 2 is set at a vertical direction in the wearing state, and the turning pin 15 is turned to keep the display unit arm 4 level. In this case, as shown in FIG. 4, the orientation of the headphone housing 2 becomes oblique, and an angle formed between the orientation of the headphone housing 2 and the horizontal direction is 90° or more.

Figure 5:
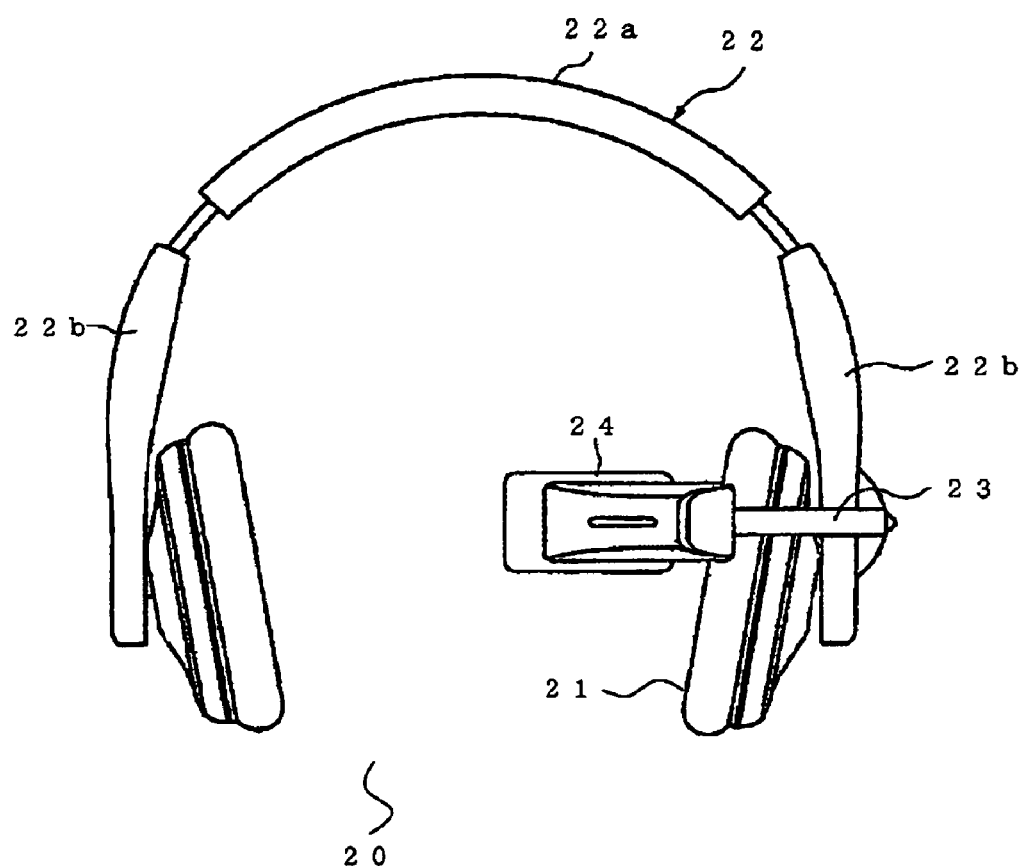
FIG. 5 is a view showing an outline of a head-mounted display according to another embodiment of the present invention.

Another embodiment of the present invention will be described below with reference to the drawing. FIG. 5 is a view showing an outline of a head-mounted display 20 according to another embodiment of the present invention. As shown in FIG. 5, the head-mounted display 20 includes right and left headphone housings 21 (fixing portions). The headphone housings 21 are brought into contact with the head (ear portions) to fix the headphones to the head, and the headphone housings 21 supply sounds.

Speakers are incorporated in the headphone housings 21 to supply sounds to the ears. As shown in FIG. 5, the right and left headphone housings 21 are connected by a head band portion 22 (connection portion) (the headphone housings 21 can be moved to a certain extent with respect to the head band portion 22, and the headphone housings 21 are inclined toward at least one of the vertical direction and the back and forth direction). The head band portion 22 has resilience, and the right and left headphone housings 21 impart a biasing force such that the head (ear portions) of a user is caught in the space between the headphone housings 21.

The head band portion 22 is divided into a head-vertex portion 22a and a head-side portion 22b, and a distance between the head-vertex portion 22a and the head-side portion 22b can be changed by sliding. A display unit 24 is connected to the head band portion 22 with the display unit arm 23 interposed therebetween such that the display unit 24 is turnable in the back and forth direction in the wearing state.

In use, the display unit 24 is located in front of an eye to observe video displayed in the display unit 24.

The head-side portion 22b, in which the display unit arm 23 is provided, is vertically movable relative to both the head-vertex portion 22a and the fixing portion (headphone housing 21). The connection portion 22 has resilience, and the connection portion 22 has the biasing force for catching the head of the user in the space therebetween. This enables the head-side portion 22b to be substantially maintained at a constant position, and therefore the display unit arm 23 and display unit 24 which are provided in the head-side portion 22b can be maintained substantially level.

Similarly to the head-mounted display 1 shown in FIG. 3, in the head-mounted display 20 shown in FIG. 5, the vertical direction of the headphone housings 2 is set at the vertical direction in the wearing state, and the display unit 24 is turned to keep the display unit arm 23 level. In this case, as shown in FIG. 5, the orientation of the headphone housing 21 becomes oblique, and the angle formed between the orientation of the headphone housings 21 and the horizontal direction is 90° or more.

Other aspects according to the present invention will be described below.

In order to solve the problem, a second aspect according to the present invention is the video display device of the first aspect, wherein the inclination of the fixing portions ranges from 5 to 20° relative to a perpendicular direction.

In order to solve the problem, a third aspect according to the present invention is the video display device of the first or second aspect, wherein a support position where the display unit arm is supported by the one of the fixing portions or the connection portion is located above an ear axis by 10 to 30 mm.

In order to solve the problem, a fourth aspect according to the present invention is a video display device which is mounted on a head to observe displayed video, the video display device including: two fixing portions which fix the video display device to the head; a connection portion which connects the fixing portions; a display unit arm which is supported by one of the fixing portions or the connection portion; and a display unit which is provided in a leading-end portion of the display unit arm to display the video on an eye of a user, wherein the fixing portions are supported by the connection portion while being movable with respect to the connection portion such that the fixing portions are inclined toward at least one of a vertical direction and a back and forth direction in wearing the video display device.

In order to solve the problem, a fifth aspect according to the present invention is a video display device which is mounted on a head to observe displayed video, the video display device comprising: two fixing portions which fix the video display device to the head; a connection portion which connects the fixing portions; a plurality of head-side portions which constitute the connection portion, the head-side portions being retained while being movable with respect to each other, a distance between the head-side portions being changeable; a display unit arm which is supported by one of the head-side portions; and a display unit which is provided in a leading-end portion of the display unit arm to display the video on an eye of a user, wherein the fixing portions are supported by the head-side portions while being movable with respect to the head-side portions such that the fixing portions are inclined with respect to a vertical direction of the video display device.

The present invention can provide the video display device which realizes the well-balanced appearance without complicating the adjustment of the display unit.

The invention claimed is:

1. A video display device which is mounted on a head of a person to observe displayed video, the video display device comprising:
    two fixing portions which fix the video display device to the head of the person;
    a connection portion which connects the fixing portions to each other;
    a display unit arm which is supported by one of the fixing portions or by the connection portion;
    a display unit which is provided in a leading-end portion of the display unit arm to display the video on an eye of the person; and
    a supporting portion by which the display unit arm is supported by the one of the fixing portions or by the connection portion, the supporting portion including a first turning pin about which the display unit arm is turned to impart a vertical swing motion of the display unit arm and a second turning pin which is fitted in the first turning pin and is turned in the first turning pin to impart a horizontal swing motion of the display unit arm, and wherein the first turning pin is arranged so that when an angle formed between a side of each of the fixing portions contacting the head and a horizontal direction is more than 90 degrees, the first turning pin maintains the display unit arm horizontal.

2. The video display device according to claim 1, wherein an inclination of the fixing portions ranges from 5 to 20 ° relative to a vertical direction.

3. The video display device according to claim 2, wherein a support position where the display unit arm is supported by the one of the fixing portions or by the connection portion is located above an ear axis by 10 to 30 mm.

4. The video display device according to claim 1, wherein a support position where the display unit arm is supported by the one of the fixing portions or by the connection portion is located above an ear axis by 10 to 30 mm.

5. The video display device according to claim 1, wherein a rotation axis of the first turning pin extends horizontally when the angle formed between the side of each of the fixing portions contacting the head and the horizontal direction is more than 90 degrees.

* * * * *

UNITED STATES PATENT AND TRADEMARK OFFICE
CERTIFICATE OF CORRECTION

| | | |
|---|---|---|
| PATENT NO. | : 8,378,925 B2 | Page 1 of 1 |
| APPLICATION NO. | : 12/314477 | |
| DATED | : February 19, 2013 | |
| INVENTOR(S) | : Chiaki | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 816 days.

Signed and Sealed this
Eleventh Day of November, 2014

Michelle K. Lee
*Deputy Director of the United States Patent and Trademark Office*